(12) United States Patent
Papasakellariou et al.

(10) Patent No.: US 9,565,664 B2
(45) Date of Patent: Feb. 7, 2017

(54) METHOD AND APPARATUS FOR TRANSMITTING REFERENCE SIGNALS IN COMMUNICATION SYSTEMS

(71) Applicant: Samsung Electronics Co., Ltd., Gyeonggi-do (KR)

(72) Inventors: Aris Papasakellariou, Houston, TX (US); Joon-Young Cho, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 559 days.

(21) Appl. No.: 13/774,452

(22) Filed: Feb. 22, 2013

(65) Prior Publication Data

US 2013/0163506 A1     Jun. 27, 2013

Related U.S. Application Data

(62) Division of application No. 12/856,319, filed on Aug. 13, 2010, now Pat. No. 8,406,215.

(60) Provisional application No. 61/233,640, filed on Aug. 13, 2009.

(51) Int. Cl.
*H04Q 7/00* (2006.01)
*H04W 40/00* (2009.01)
*H04W 72/04* (2009.01)
*H04L 5/00* (2006.01)
*H04L 25/03* (2006.01)

(52) U.S. Cl.
CPC .......... *H04W 72/042* (2013.01); *H04L 5/0007* (2013.01); *H04L 5/0048* (2013.01); *H04L 2025/03808* (2013.01)

(58) Field of Classification Search
USPC ........................................................ 370/315
See application file for complete search history.

(56) References Cited

U.S. PATENT DOCUMENTS

| 2007/0153734 | A1* | 7/2007 | Lee ...................... H04B 7/2606 370/329 |
| 2010/0080269 | A1* | 4/2010 | Kim et al. ..................... 375/211 |
| 2010/0153806 | A1 | 6/2010 | Yu et al. |
| 2010/0322145 | A1* | 12/2010 | Yu .......................... H04B 7/155 370/315 |

(Continued)

FOREIGN PATENT DOCUMENTS

WO    WO 2007/069848    6/2007

OTHER PUBLICATIONS

U.S. Appl. No. 61/218,908.*

(Continued)

*Primary Examiner* — Edan Orgad
*Assistant Examiner* — Sithu Ko
(74) *Attorney, Agent, or Firm* — The Farrell Law Firm, P.C.

(57) ABSTRACT

Methods and apparatus are described for a Relay Node (RN) that is transparent to User Equipments to transmit, together with a base station (Node B), Reference Signals (RS) to UEs, to receive RS from UEs, to perform transmissions of Transport Blocks (TBs) to the Node B or to UEs and receptions of TBs from the Node B or from UEs, where the transmissions of TBs from the RN are for retransmissions associated with a Hybrid Automatic Repeat reQuest (HARD) process for the same TBs, and enabling the Node B to obtain control information signaled from UEs while signaling from the RN interferes with that signaling of control information.

12 Claims, 13 Drawing Sheets

(56) References Cited

U.S. PATENT DOCUMENTS

| | | | |
|---|---|---|---|
| 2010/0329188 A1* | 12/2010 | Jen | H04B 7/2606 370/328 |
| 2011/0013552 A1* | 1/2011 | Ali | H04B 7/15521 370/315 |
| 2011/0170475 A1 | 7/2011 | Raaf | |
| 2011/0194485 A1* | 8/2011 | Horneman | H04W 72/042 370/315 |
| 2011/0222428 A1* | 9/2011 | Charbit | H04B 7/15557 370/252 |
| 2013/0064169 A1* | 3/2013 | Song et al. | 370/315 |

OTHER PUBLICATIONS

Qualcomm Europe, "Preference for Relay Operation in LTE-A", 3GPP TSG-RAN WG1 #56, R1-090876, Feb. 9, 2009.

Alcatel-Lucent, CHTTL, "System Design Frameworks to Support Type II Relay Operation in LTE-A", 3GPP TSG RAN WG1 #57, R1-092157, May 4, 2009.

* cited by examiner

METHOD AND APPARATUS FOR TRANSMITTING REFERENCE SIGNALS IN COMMUNICATION SYSTEMS

PRIORITY

The present application is a divisional application of U.S. patent application Ser. No. 12/856,319, filed on Aug. 13, 2010, which claims priority under 35 U.S.C. §119(e) to U.S. Provisional Application No. 61/233,640, entitled "Decode and Forward Relay Systems", which was filed on Aug. 13, 2009, the contents of which are incorporated herein by reference.

BACKGROUND OF THE INVENTION

1. Field of the Invention

The present invention generally relates to wireless communication systems and, more particularly, to the application of relays serving as an intermediate node for signal transmissions between user equipments and base stations.

2. Description of the Art

A communication system consists of a DownLink (DL), conveying transmissions of signals from a base station (Node B) to User Equipments (UEs), and of an UpLink (UL), conveying transmissions of signals from UEs to the Node B. A UE, also commonly referred to as a terminal or a mobile station, may be fixed or mobile and may be a wireless device, a cellular phone, a personal computer device, etc. A Node B is generally a fixed station and may also be referred to as a Base Transceiver System (BTS), an access point, etc. A Relay Node (RN) is an intermediate node between the Node B and the UE, it may participate in either or both the DL and UL transmission of signals, and it may be fixed or mobile.

Relay technology has been widely used to extend coverage in heavily shadowed areas in a cell or in areas beyond the Node B range. Moreover, although not yet extensively used for this purpose, RNs can provide gains in spectral efficiency particularly for UEs at a cell edge. Therefore, a RN may be used in a rural area to improve cell coverage, in an urban hot spot to increase spectral efficiency, or in a heavily shadowed area to avoid holes in coverage. Based on the protocol layer at which a data packet is available at the RN, the RN can be classified as Layer 0 (L0), Layer 1 (L1), Layer 2 (L2), or Layer 3 (L3).

An L0 RN is a Radio Frequency (RF) repeater operating at the PHYsical (PHY) layer. An L0 RN amplifies and forwards the received signal in the analog front-end for coverage extension. Since a L0 RN cannot distinguish the desired signal from interference and noise, it typically does not improve spectral efficiency. Also, RF repeaters require large transmitter/receiver isolation which requires a large device size and relatively high hardware and installation costs.

An L1 RN is also a repeater operating at the PHY layer which, after some base-band processing such as, for example, frequency domain filtering, amplifies only a portion of the received signal waveform. An L1 RN can provide only limited gains in the quality of the desired signal and is therefore not appropriate for improving spectral efficiency.

An L2 RN incorporates protocol layers above the PHY layer, such as the Medium Access Control (MAC) layer and possibly the Radio Link Control (RLC) layer, but it does not incorporate all protocol layers of a conventional Node B. For example, an L2 RN does not incorporate the Packet Data Convergence Protocol (PDCP) and Internet Protocol (IP) layers. L2 RNs can be further classified depending on their level of functionality. Several possible functionalities of L2 RNs exist. To solve the problems existing in the prior art, the present invention focuses on improving the following two functionalities:

a) The end-to-end operating points of the Hybrid Automatic Repeat reQuest (HARQ) process are between the Node B and the UE while the RN assists by transmitting data information, and possibly control information, to the Node B in the UL of the communication system or to the UE in the DL of the communication system.

b) The RN has available the MAC Protocol Data Units (PDUs). HARQ operates independently at the Node B and RN or at the UE and RN. The RN can perform its own scheduling and link adaptation. Link adaptation refers to the selection of the Modulation and Coding Scheme (MCS) and/or of the signal transmission power. Alternatively, the Node B can perform scheduling and link adaptation on behalf of the RN and signal the corresponding information to the RN.

An L3 RN has all the functionalities of a Node B and therefore supports the whole IP/PDCP/MAC/PHY protocol stack. The L3 RN has its own Physical Cell Identity (PCI) and is typically indistinguishable to UEs from a regular Node B. IP packets are transported to the L3 RN on the relay backhaul link (between the relay and serving eNB).

A structure for a communication system incorporating an RN is illustrated in FIG. 1. The Node B 110 transmits and receives data or control signals 170D and 170U to and from UE1 120, respectively, through a direct link, regardless of the RN presence. The Node B 110 also transmits and receives data or control signals 160D and 160U to and from the RN 130, respectively, through a (wireless) backhaul link. The RN 130 transmits and receives data or control signals 150D and 150U to and from UE2 140, respectively, through an access link. The Node B 110 may or may not transmit or receive data or control signals 160D and 160U for UE2 140.

The link between the Node B and the RN (backhaul link) may be at the same or at a different frequency band than the link between the RN and the UE. If it is at the same frequency band, the RN is referred to as in-band; otherwise, it is referred to as out-band. In-band RNs need RF isolation because otherwise some of the signal from the RN transmitter will leak into the RN receiver which will cause positive feedback leading to operational failure. The present invention assumes that the RN transmits and receives signals in-band using Time Division Multiplexing (TDM). A guard time period exists between RN transmission and RN reception in order to switch between the transmitter RF and the receiver RF. Typically, RNs are assumed to operate in a half-duplex mode where the RN does not transmit and receive at the same frequency and at the same time.

FIG. 2 illustrates a framework for communication of a RN 210 with a Node B 220 and with UEs 230. The Transmission Time Interval (TTI) is assumed to be one sub-frame 240 which consists of transmission symbols. As the RN is assumed to not be able to simultaneously transmit and receive at the same frequency band, it can only transmit signals to UEs (access link) or to the Node B (backhaul link), or receive signals from the UEs (access link) or from the Node B (backhaul link) Five sub-frames 250T, 260T, 270T, 280T, and 290T, over a period of 10 sub-frames constituting one frame, are considered in FIG. 2 for RN transmission and five sub-frames 250R, 260R, 270R, 280R, and 290R, are considered for RN reception. Moreover, in some sub-frame symbols, the RN may be transmitting while in other sub-frame symbols the RN may be receiving. A guard period is obtained by partial or full puncturing of symbols at the beginning of the sub-frame, or at the end of the sub-frame, or both.

Link adaptation of DL transmissions is enabled by the Node B transmitting Reference Signals (RS) the UEs can use to derive a DL metric, such as the channel medium response or the Signal-to-Noise and Interference Ratio (SINR), at sub-bands of the operating BandWidth (BW). A UE can provide the Node B a Channel State Information (CSI), such as the SINR over sub-bands of the operating BW, through feedback in the UL thereby enabling link adaptation by the Node B for a subsequent DL transmission to the UE. Such an RS will be referred to CSI-RS. The CSI-RS is scrambled with a sequence derived from the PCI of the Node B. The Node B can inform the UE of the selected MCS through a control channel.

FIG. 3 illustrates a DL sub-frame structure assuming Orthogonal Frequency Division Multiplexing (OFDM) for the signal transmission method. The DL sub-frame consists of fourteen OFDM symbols 310. Some OFDM symbols are used to transmit the Physical Downlink Control CHannel (PDCCH) 320 conveying control information to UEs while the remaining OFDM symbols are used to transmit the Physical Downlink Shared CHannel (PDSCH) 330 conveying multiple Transport Blocks (TBs) of data information to multiple UEs, respectively. The number of PDCCH OFDM symbols may vary per sub-frame, for example between one and three. The PDCCH includes Scheduling Assignments (SAs) for DL or UL transmissions of TBs or acknowledgement signals as they are subsequently described. The Node B transmits a Physical Control Format Indicator CHannel (PCFICH) at predetermined locations in the first OFDM symbol (not shown for brevity) to inform the UEs of the PDCCH size. Each OFDM symbol is transmitted over an operating BW which consists of frequency resource units which will be referred to as Physical Resource Blocks (PRBs). Each PRB further consists of $N_{sc}^{RB}$ sub-carriers which are also referred to as Resource Elements (REs) 340. A UE is allocated $M_{PDSCH}$ PRBs for a total of $M_{sc}^{PDSCH}=M_{PDSCH} \cdot N_{sc}^{RB}$ REs for PDSCH reception. FIG. 3 assumes a Node B with four transmitter antennas. The Node B transmits RS, RS1 350A and RS2 350B, from two antennas (for example, by combining pairs of the four transmitter antennas). These RSs can assist, for example, with PDCCH demodulation and will be referred to as Cell-specific RS (CRS). PDSCH demodulation can be based either on the CRS or on UE-specific Demodulation RS (URS) which is not shown for brevity. The Node B also transmits CSI-RS from each physical antenna, CSI-RS 1 360A, CSI-RS 2 360B, CSI-RS 3 360C, and CSI-RS 4 360D.

Link adaptation of UL transmissions is enabled by UEs transmitting RSs sounding a part or all the UL operating BW. Such RSs will be referred to as Sounding RSs (SRS). The Node B can then directly obtain the CSI for a UE and signal the MCS and/or power for UL signal transmissions through SAs in the PDCCH.

FIG. 4 illustrates an exemplary UL sub-frame structure for the transmission of a Physical Uplink Shared CHannel (PUSCH) using Single-Carrier Frequency Division Multiple Access (SC-FDMA). The PUSCH conveys TBs of data information and possibly control information from multiple UEs to the Node B. The UL sub-frame consists of fourteen SC-FDMA symbols 410 used to transmit data signals, control signals 420, or RSs 430 assisting in their Demodulation (DRS). The DRS can be based on the transmission of a Constant Amplitude Zero Auto-Correlation (CAZAC) sequence having a Cyclic Shift (CS). The UL transmission BW also consists of PRBs with each PRB having $N_{sc}^{RB}$ REs. A UE is allocated $M_{PUSCH}$ PRBs for a total of $M_{sc}^{PUSCH}=M_{PUSCH} \cdot N_{sc}^{RB}$ REs for its PUSCH transmission BW 440. The last sub-frame symbol may be used for SRS transmission 450, from one or more UEs. A similar sub-frame structure can be used for the Physical Uplink Control CHannel (PUCCH), which conveys Uplink Control Information (UCI) to the Node B. UCI includes HARQ ACKnowledgement (HARQ-ACK) signals, in response to PDSCH receptions, or CSI signals.

A UL SA is described through a set of contents in Table 1. Additional IEs or different number of bits for the indicative IEs in Table 1 may apply.

TABLE 1

Information Elements of a UL SA for PUSCH Transmission.

| Information Element | Number of Bits | Comment |
| --- | --- | --- |
| PRB Allocation | 11 | Assignment of Consecutive PRBs |
| MCS | 5 | MCS Levels (or Transport Block Size) |
| NDI | 1 | New Data Indicator (synchronous HARQ) |
| TPC Command | 2 | Power control commands |
| CS Indicator | 3 | Maximum of 8 CS |
| Hopping Flag | 1 | Frequency Hopping (Yes/No) |
| CSI Request | 1 | Include CQI report (Yes/No) |
| CRC (UE ID) | 16 | UE ID masked in the CRC |
| TOTAL | 40 | |

The first IE in provides the PUSCH PRB allocation. For an operating BW of P PRBs, the number of possible contiguous PRB allocations (for SC-FDMA) is $1+2+\ldots+P=P(P+1)/2$ and can be signaled with $\lceil \log_2(P(P+1)/2) \rceil$ bits where $\lceil\ \rceil$ is the ceiling operation rounding a number to its next higher integer. For P=50 PRBs assumed in Table 1, the number of required bits is 11. The second IE provides the MCS. With 5 bits, up to 32 MCS can be indicated. For example, the modulation may be QPSK, QAM16, or QAM64 while the coding rate may take discrete values between 1/16 and 1. The third IE is the New Data Indicator (NDI). The NDI is set to 1 if the UE should transmit a new TB, while it is set to 0 if the UE should transmit the same TB as in a previous PUSCH transmission. Synchronous HARQ is assumed. The fourth IE provides the Transmission Power Control (TPC) command for the UE to adjust its PUSCH transmission power. For example, the 2 bits of the TPC IE, [00, 01, 10, 11], may respectively adjust the PUSCH transmission power by [−1, 0, 1, 3] deciBels (dBs). The fifth IE provides the CS of the CAZAC sequence serving as DRS. The sixth IE indicates whether frequency hopping applies to the PUSCH transmission. The seventh IE indicates whether the UE should include a DL CSI report in the PUSCH transmission. Each SA also contains a Cyclic Redundancy Check (CRC) which is typically scrambled with the UE IDentity (UE-ID).

A DL SA is described through a set of contents in Table 2. Additional IEs or different number of bits for the indicative IEs in Table 2 may apply.

TABLE 2

Fields of a DL SA for PDSCH Transmission.

| Information Field | Number of Bits | Comment |
| --- | --- | --- |
| Resource Allocation Header | 1 | Type 0 or Type 1 |
| PRB Allocation | 25 | Assignment of RBs |

TABLE 2-continued

Fields of a DL SA for PDSCH Transmission.

| Information Field | Number of Bits | Comment |
| --- | --- | --- |
| MCS or TB Size (TBS) | 5 | MCS Levels or Transport Block Size |
| HARQ Process | 3 | Up to 8 HARQ processes |
| Redundancy Version (RV) | 2 | Up to 4 RVs |
| NDI | 1 | NDI (synchronous HARQ) |
| TPC Command | 2 | Power control commands |
| CRC (UE ID) | 16 | UE ID masked in the CRC |
| TOTAL | 55 | |

The first IE is the Resource Allocation (RA) header and specifies the RA type. This is not material to the present invention, and for brevity, it is not further discussed. The second IE provides the PDSCH PRB allocation for the RA type. The third IE provides the MCS or the TB Size (TBS). The fourth IE indicates the HARQ process number (asynchronous HARQ is assumed) for 8 HARQ processes. The fifth IE indicates the Redundancy Version (RV) for the HARQ process assuming Incremental Redundancy (IR) for HARQ retransmissions of a TB. Four RVs are assumed, RV0, RV1, RV2, and RV3, and, in order to maximize the coding gains, they are used respectively for the initial TB transmission and for the first, second, and third TB retransmissions (maximum of 4 HARQ transmissions for a TB). The sixth IE is the NDI which is set to 1 if a new TB is transmitted and is set to 0 if the same TB, possibly with a different RV, is transmitted. The seventh IE provides the TPC command for power adjustments of the HARQ-ACK signal the UE transmits in the PUCCH in response to the PDSCH reception.

Another important classification of relays is whether they are transparent or non-transparent to UEs. A Transparent RN (T-RN) is indistinguishable to UEs from their serving Node B. This implies that a T-RN shares the same PCI as its associated Node B (L0/L1/L2 RNs). A Non-Transparent RN (NT-RN) appears to UEs as a separate Node B having its own PCI (e.g. L2/L3 RNs). The present invention considers transparent RNs. It is further assumed that a T-RN forwards only data signals from and to UEs (it does not forward control signals) and is therefore primarily beneficial for spectral efficiency gains and not for coverage extension (control signaling is assumed to be between a UE and the Node B).

The placement of an RN is typically such that it achieves a good (wireless) link quality to the Node B. A T-RN monitors the signals between the Node B and targeted UEs and attempts to decode the respective PDSCH or PUSCH transmissions. If the decoding at the T-RN is successful and the decoding at the UE (or Node B) is not, the T-RN will contribute through subsequent concurrent HARQ retransmissions in synchronized time/frequency resources. For example, in the DL, the Node B transmits the initial data packet to a UE. The transparent RN also receives this data packet. If the reception at the UE fails, as indicated by the subsequent transmission by the UE of a HARQ-ACKnowledgement (HARQ-ACK) signal with negative value (NACK), the T-RN can participate in the HARQ retransmission (after decoding and re-encoding the received data packet). This T-RN type is also known as a "Decode and Forward" RN. The Node B may or may not participate in the HARQ retransmission.

T-RNs are associated with a series of advantages such as the following:

a) T-RNs avoid frequent handovers and coverage imbalances associated with NT-RNs that create their own cells and typically have lower transmission power than the Node B. The coverage imbalance problem may often be so severe that additional measures, such as interference co-ordination, are required in order to enable sufficiently reliable NT-RN operation.
b) As the backhaul and access links of NT-RNs are TDM, an NT-RN serving many UEs requires extensive packet aggregation to align each UE's traffic in the same backhaul link sub-frame, thereby resulting in scheduling loss. T-RNs can, to a large extent, avoid this drawback of NT-RNs.
c) T-RNs may not need to waste resources to support a backhaul link and an access link, thereby directly avoiding a respective spectral efficiency loss.
d) T-RNs do not require the whole protocol stack, thereby offering lower implementation cost.
e) For synchronous, non-adaptive HARQ, T-RNs offer smaller latency as a backhaul link is not needed. In non-adaptive HARQ, the MCS and PRBs for signal transmission are the same as for the initial transmission.

T-RNs are also associated with a series of implementation challenges:

a) T-RNs do not transmit their own CRS (as they do not transmit PDCCH) and consequently cannot support link adaptation for PDSCH transmissions to UEs. The PDSCH reception at the UE is assumed to be based on URS.
b) As a UE may insert UCI in its PUSCH transmission which the T-RN is aware of but cannot know its content in advance, it cannot forward such PUSCH transmissions to the Node B. This is because as the DRS transmitted by the T-RN overlaps with the DRS transmitted by the UE, the channel estimate obtained for the demodulation of the UCI which is transmitted only by the UE will not be accurate.
c) As the PDCCH size may vary per sub-frame, the T-RN needs to decode the PCFICH and to switch between reception mode and transmission mode before it transmits PDSCH. A simple approach solving this issue is to always have the maximum PDCCH size in sub-frames with RN PDSCH transmission. Then, the PDSCH size is also deterministic. This will not create any meaningful inefficiency as UEs served by the T-RN typically experience low SINR for Node B transmissions and consequently require a large PDCCH size when scheduled.
d) T-RN cannot support asynchronous or adaptive HARQ as the T-RN needs to know the scheduling information in advance in order to participate in a PDSCH or PUSCH transmission.

Therefore, there is a need to enable link adaptation for T-RNs.

There is also a need to identify UEs for which the T-RN assists in the communication process with the Node B.

There is also a need to support PUSCH transmissions by T-RNs when a UE also includes control information in its PUSCH transmission.

Finally, there is also a need to enable synchronized DL HARQ transmissions between the Node B and the T-RN and synchronized UL HARQ transmissions between a UE and the T-RN.

SUMMARY OF THE INVENTION

Accordingly, the present invention has been designed to solve at least the aforementioned limitations and problems in the prior art and the present invention provides methods and apparatus for enabling link adaptation for Relay Nodes that are transparent (T-RNs) to User Equipments (UEs), for identifying UEs for which the T-RN assists in their communication process with a base station (Node B), for supporting transmissions by T-RNs in Resource Elements (REs) where the UE transmits control information, and for enabling synchronized DL HARQ transmissions between the Node B and the T-RN and synchronized UL HARQ transmissions between a UE and the T-RN.

In accordance with a first embodiment, the Node B assigns to the T-RN instances for the T-RN to transmit Reference Signals (RSs) that are either separate from the instances the Node B transmits RSs or are a subset of the instances the Node B transmits RSs. The RSs from both the Node B and the T-RN are scrambled with the same sequence which may depend on the physical cell identity of the Node B. Based on the instance the UEs report DL Channel State Information (CSI) obtained from the RS reception, the Node B or the T-RN know whether that DL CSI corresponds to the RS transmitted from the Node B or from the T-RN. The Node B may also inform the UEs to not use RSs in multiple transmission instances for obtaining the DL CSI.

In accordance with a second embodiment, the T-RN receives RS transmissions from UEs and computes a UL CSI which the T-RN then transmits to the Node B. The T-RN obtains the parameters with which the RSs are transmitted from the UEs either through the same signaling it is informed from the Node B to the UEs or through separate signaling from the Node B. The T-RN may suspend the transmission of a Transport Block (TB) to the Node B in order to receive the RSs transmitted from UEs.

In accordance with a third embodiment, the T-RN transmits a sequence known to the Node B in REs where a UE transmits control information in a Physical Uplink Shared CHannel (PUSCH). The RS transmitted by the T-RN to assist in the demodulation of a TB transmitted by the T-RN in the PUSCH (DRS) may be orthogonal to the DRS the UE transmits in the PUSCH.

In accordance with a fourth embodiment, the Node B performs a first number of HARQ retransmissions for a TB and the T-RN performs a second number of HARQ-ACK retransmissions from the same TB where the first number can be larger than the second number and the second number is configured to the T-RN by the Node B.

In accordance with a fifth embodiment, the T-RN participates in a retransmission of a TB in accordance with a respective HARQ process when it receives a HARQ-ACK signal, either from the Node B or from the UE, with a negative value. If the HARQ process is synchronous and non-adaptive, the T-RN uses the same parameters, but possibly with a different redundancy version, for the retransmission of the TB as they were used for the initial HARQ transmission either from the UE or from the Node B, respectively. If the HARQ process is either asynchronous or adaptive, the T-RN uses the parameters conveyed in a Scheduling Assignment (SA) transmitted from the Node B to the UE that configures the parameters for the HARQ retransmission of the TB.

In accordance with a sixth embodiment, the T-RN participates in a retransmission of a TB in accordance with a respective HARQ process when it receives an SA from the Node B at an earlier Transmission Time Interval (TTI) where the SA configures the TB transmission parameters at a later TTI. The SA transmitted to the T-RN may indicate the power from the T-RN of transmission conveying the TB and the respective TTI. The format of the SA transmitted from the Node B to the T-RN may be different than the format of the SA transmitted to the UE the TB is intended for, and the format of the SA transmitted to the RN may contain information for the transmission from the T-RN of TBs to multiple UEs. The Node B may scramble the Cyclic Redundancy Check (CRC) of the SA transmitted to the T-RN either by the T-RN identity, or by using both the T-RN and the UE identities, or by using a known scrambling sequence.

BRIEF DESCRIPTION OF THE DRAWINGS

The above and other aspects, features, and advantages of the present invention will be more apparent from the following detailed description taken in conjunction with the accompanying drawings, in which.

DETAILED DESCRIPTION OF EMBODIMENTS OF THE PRESENT INVENTION

The present invention will now be described more fully hereinafter with reference to the accompanying drawings. This invention may, however, be embodied in many different forms and should not be construed as limited to the embodiments set forth herein. Rather, these embodiments are provided so that this disclosure will be thorough and complete and will fully convey the scope of the invention to those skilled in the art.

Additionally, although the present invention is described in relation to an Orthogonal Frequency Division Multiple Access (OFDMA) communication system, it also applies to all Frequency Division Multiplexing (FDM) systems in general and to Single-Carrier Frequency Division Multiple Access (SC-FDMA), OFDM, FDMA, Discrete Fourier Transform (DFT)-spread OFDM, DFT-spread OFDMA, SC-OFDMA, and SC-OFDM in particular.

The first object of the invention considers the support of link adaptation for DL and UL transmissions from a T-RN and the support for the identification of UEs for which communication can be assisted by a T-RN.

In the DL, the invention considers that transmission of CSI-RS from the Node B is either suspended at predetermined sub-frames and replaced by CSI-RS transmission from the T-RN, in accordance with a first embodiment, or overlapped with CSI-RS transmission from the T-RN at predetermined sub-frames, in accordance with a second embodiment (the Node B and the T-RN use the same PCI).

Figure 1:
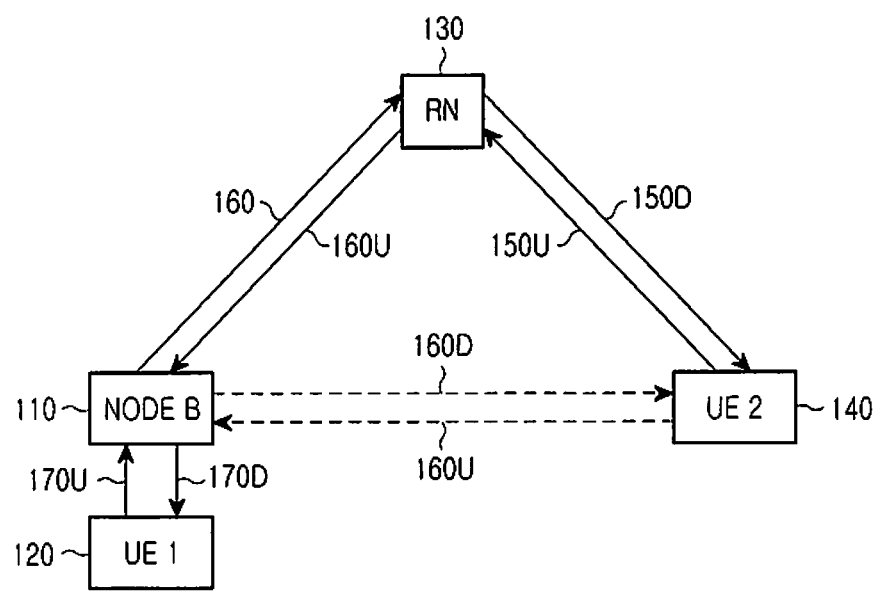
FIG. 1 is a diagram illustrating a conventional structure for a communication system incorporating an RN.
Figure 2:
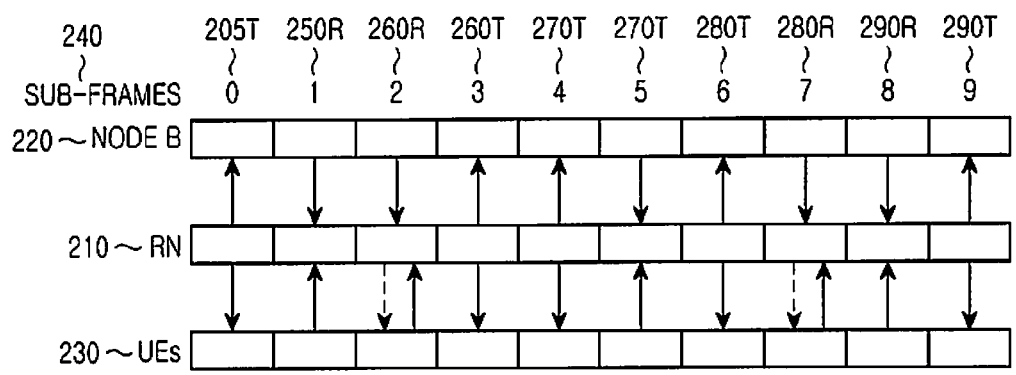
FIG. 2 is a diagram illustrating a conventional framework for communication of an RN with a Node B and with UEs.
Figure 3:
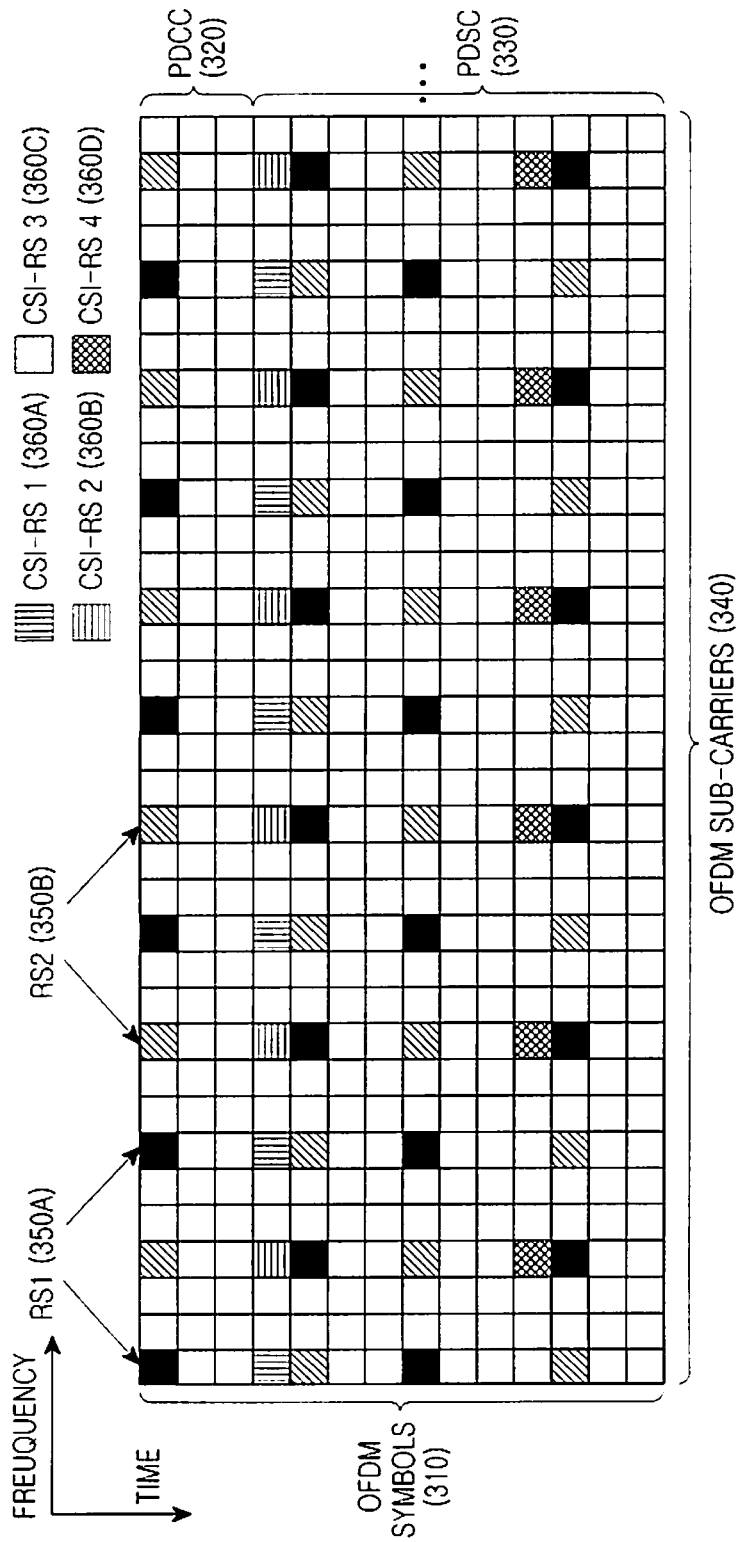
FIG. 3 is a diagram illustrating a conventional downlink sub-frame structure.
Figure 4:
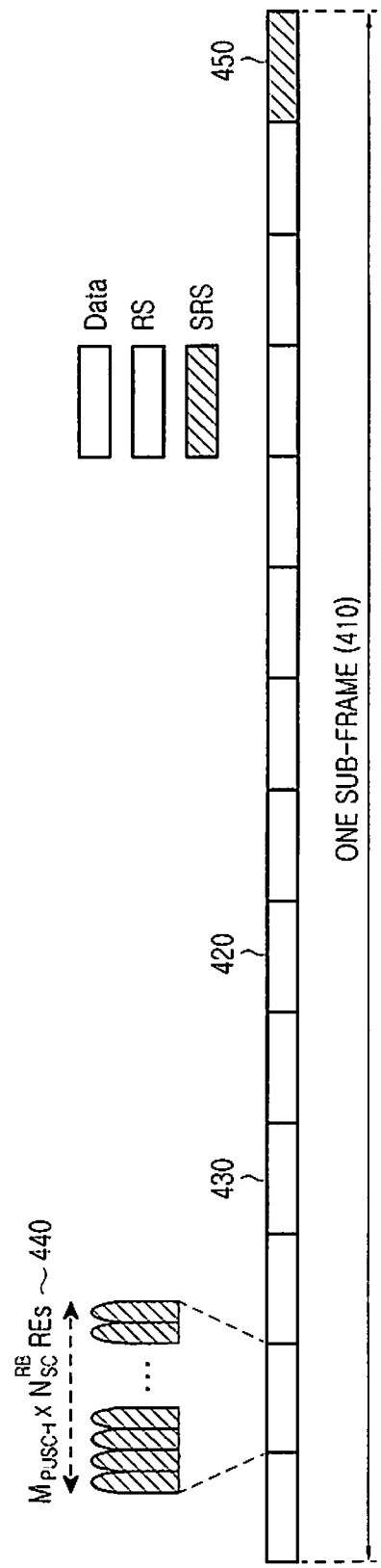
FIG. 4 is a diagram illustrating a conventional uplink sub-frame structure.
Figure 5:
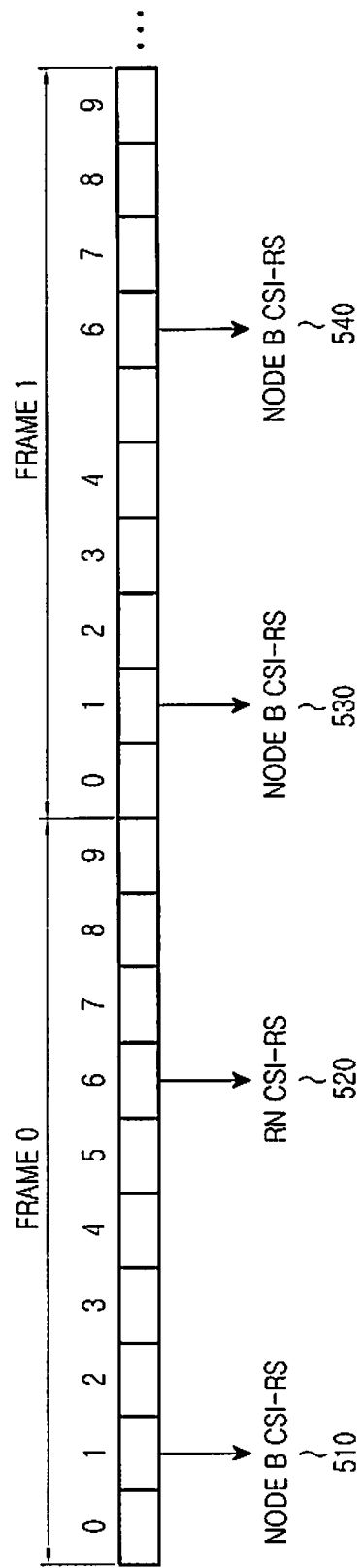
FIG. 5 is a diagram illustrating a configuration for CSI-RS transmission from a Node B and a T-RN according to a first embodiment of the present invention.

FIG. 5 illustrates an exemplary configuration for the CSI-RS transmission from a Node B and a T-RN in accordance with the first embodiment. The CSI-RS transmission occurs periodically in certain sub-frames, such as for example once every 5 sub-frames starting from sub-frame 1 in frame 0 510, 520, 530, 540. This information is broadcasted by the Node B and is available to all UEs and T-RNs in its serving cell. The Node B also configures a T-RN to transmit CSI-RS in sub-frame 6 of every even numbered frame (that is, frame 0, frame 2, and so on) 520. Other partitioning of CSI-RS transmission sub-frames from the Node B and the T-RN is also possible, including having equal transmission rates. The actual partitioning is an implementation issue and may consider the percentage of UEs served by T-RNs. A reference UE measures a DL CSI metric, such as for example a Channel Quality Indicator (CQI) at predetermined sub-bands or over the entire operating BW, and reports it to the Node B. The CSI metric obtained from the CSI-RS transmitted in sub-frame 6 of even numbered frames corresponds to the one observed for T-RN transmissions. By reporting this DL CSI metric to the Node B, and hence to the T-RN which can monitor transmissions from UEs in its serving area, both the Node B and the T-RN know of the channel conditions experienced by the UE for DL transmissions from the T-RN. The Node B can then perform PDSCH scheduling and link adaptation to the UE that accounts for the PDSCH transmission from the T-RN.

If the T-RN and the Node B have the same number of transmitter antennas, one-to-one mapping can apply for the REs used for the CSI-RS transmission from the Node B and from the T-RN for each transmitter antenna. If the T-RN has fewer transmitter antennas than the Node B, it may transmit CSI-RS from the same antenna in REs used for CSI-RS transmission from multiple Node B antennas. For example, if the Node B has four transmitter antennas and the T-RN has two transmitter antennas, the T-RN may also transmit CSI-RS from its first or second antenna in the REs used for CSI-RS transmission from the third or fourth Node B transmitter antennas, respectively. In this manner, the Node B will obtain two CSI metrics for the channel observed from one T-RN transmitter antenna, thereby allowing potential improvements in the reliability of the combined CSI metric. Otherwise, the T-RN may leave some REs empty without signal transmission (zero signal power in these REs). In the previous example, the REs used for CSI-RS transmission from the third and fourth Node B antennas may not be used by the T-RN for any signal transmission.

To achieve a proper estimate for the CSI metric when the T-RN transmits CSI-RS, the UEs should not perform time interpolation for CSI-RS transmitted in different sub-frames. Otherwise, the combination of CSI-RS from the Node B and the CSI-RS from the T-RN will lead to a corrupted CSI metric, particularly for UEs that do not communicate with the T-RN. Whether time interpolation across sub-frames is allowed may be informed to UEs as a 1-bit system parameter though a broadcast channel (for example, it can be allowed in cells without T-RNs and prohibited in cells with T-RNs). Alternatively, higher layer UE-specific signaling may be used to inform each UE whether CSI-RS interpolation across sub-frames is allowed. For example, UEs in the vicinity of the T-RN may not perform time interpolation of the CSI-RS while UEs in the vicinity of the Node B may be allowed to perform time interpolation.

Assuming that time interpolation is not allowed among consecutive CSI-RS transmissions, the Node B knows how to interpret the reported CSI depending on the UL sub-frame carrying the CSI. This is further illustrated in the exemplary setting of FIG. 6. In sub-frame 1 of DL frame 0, the Node B transmits its CSI-RS 610. In response, assuming a processing delay of about two sub-frames for a UE to compute the CSI from the CSI-RS, UEs served exclusively by the Node B (without T-RN assistance) are configured to report the CSI in UL sub-frames 3 through 6 620 with a reporting period of ten sub-frames. In sub-frame 6 of DL frame 0, the Node B does not transmit a CSI-RS in order for the T-RN to transmit its CSI-RS 630 without interference from the Node B CSI-RS. In response to the T-RN CSI-RS, UEs served by the T-RN are configured to report CSI in the next five UL sub-frames 640 with a reporting period of twenty sub-frames. Subsequently, at the next CSI-RS transmission instance, the Node B transmits its CSI-RS 650, 670, and the UEs report the respective CSI 660. The CSI reporting period for CSI-RS 650 is ten sub-frames while the CSI reporting period for CSI-RS 670 is twenty sub-frames.

Figure 6:
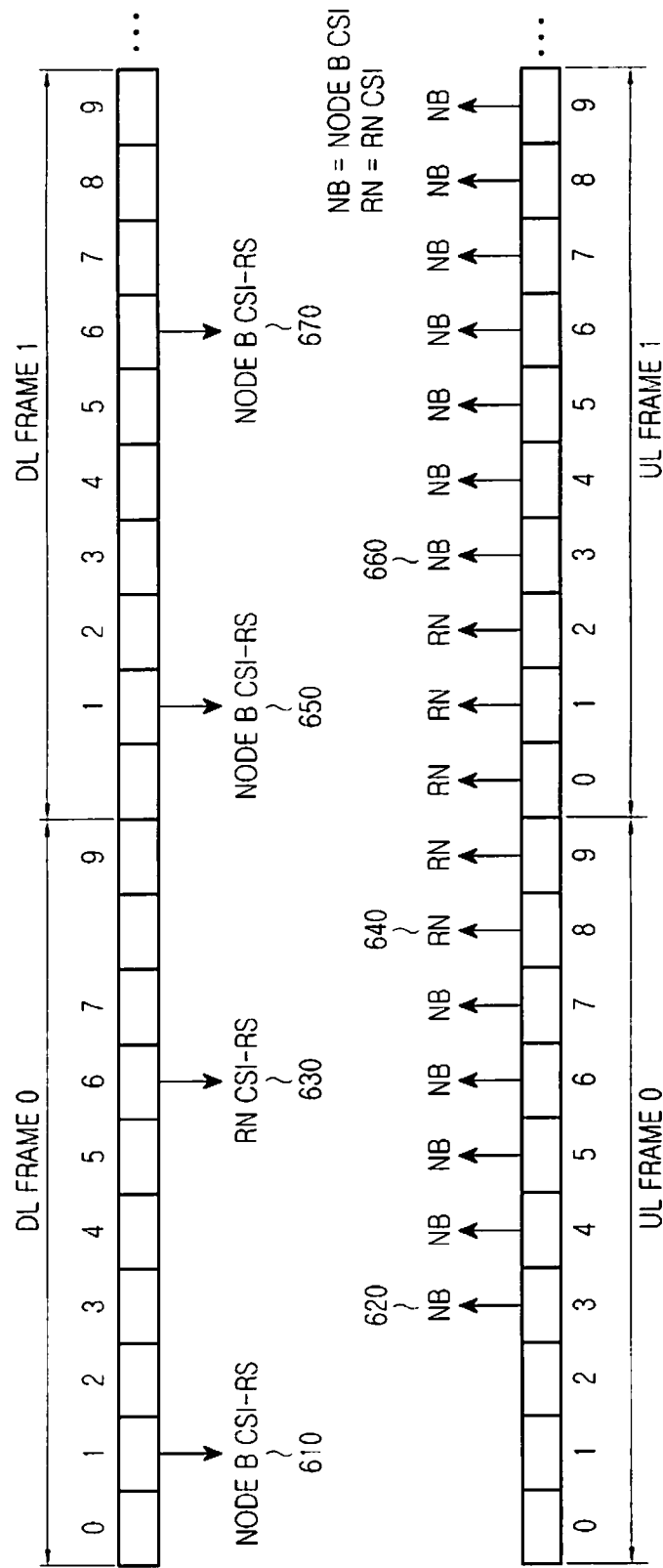
FIG. 6 is a diagram illustrating how the Node B interprets the reported CSI depending on the UL sub-frame carrying the CSI.
Figure 7:
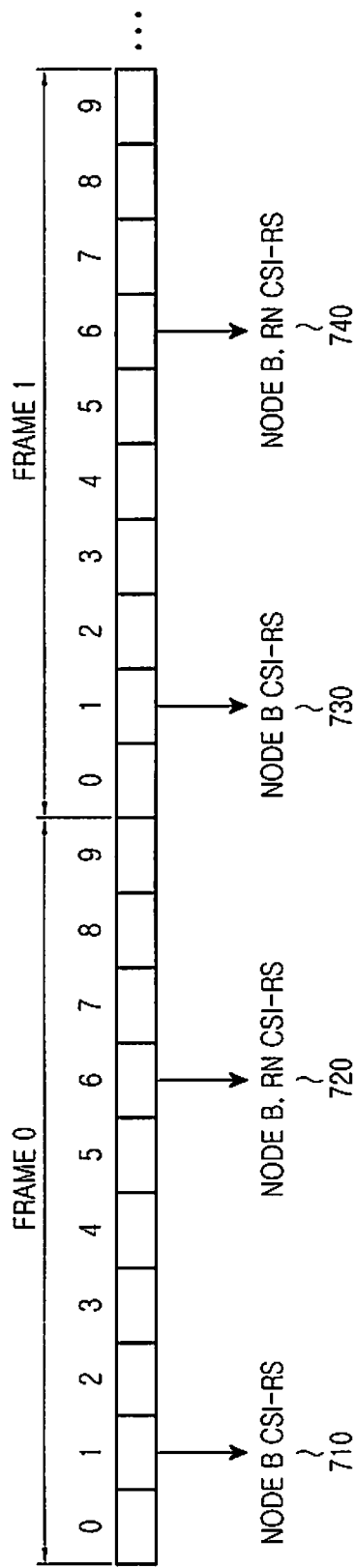
FIG. 7 is a diagram illustrating a second exemplary configuration for the CSI-RS transmission from a Node B and a T-RN according to a second embodiment of the present invention.

FIG. 7 illustrates a configuration for the CSI-RS transmission from the Node B and a T-RN in accordance with the second embodiment of the present invention. The CSI-RS transmission is again assumed to occur periodically in certain sub-frames, such as for example once every 5 sub-frames starting from sub-frame 1 in frame 0 710, 720, 730, 740. The Node B also configures the T-RN to transmit the CSI-RS in sub-frame 6 of every frame 720, 740. The difference relative to the configuration in FIG. 5 is that both the Node B and the T-RN transmit the CSI-RS in some sub-frames. Although this would result in inappropriate estimation of the CSI metric for UEs served only by the Node B or for UEs served only by the T-RN, this may often not be a problem. For some UEs served exclusively by the Node B, the CSI feedback can be configured to occur in UL sub-frames corresponding to CSI-RS transmission only from the Node B, as illustrated in FIG. 6. UEs served exclusively by the Node B may also configure CSI feedback in any UL sub-frame if the signal observed by the T-RN is substantially weaker than the signal observed by the Node B (the T-RN typically transmits at a substantially lower power than the Node B and has a correspondingly smaller coverage area). For other UEs served by both the T-RN and the Node B, the CSI feedback can be configured to occur in UL sub-frames corresponding to CSI-RS transmission from both the T-RN and the Node B. The CSI reporting structure is similar to that in FIG. 6 and is omitted for brevity. In the case where multiple T-RNs exist in a cell, as the mutual interference they create in the DL is typically negligible, they may either transmit CSI-RS on the same resources, or their CSI-RS transmission may be interleaved in time, or a combination of both may apply.

In the UL, the present invention considers that link adaptation is performed based on the SRS transmitted by the UEs as configured by the Node B. The T-RN can also receive such SRS transmissions and compute the respective UL CSI metric. The Node B can provide, explicitly or implicitly, to the T-RN the information for the SRS transmission parameters for a UE. Explicit information can be through the DL backhaul link. While implicit information can be through the T-RN monitoring the PDSCH transmitted to the UE and obtaining the SRS transmission parameters which are conveyed to the UE through UE-specific higher layer signaling in the PDSCH. The T-RN can then inform the UL CSI it observes for a reference UE to the Node B either through the PUCCH or through the PUSCH. The UL resources for the DL CSI transmission from the UE to the Node B (and the T-RN) and the UL CSI transmission from the T-RN to the Node B can be preconfigured and PDCCH signaling can be avoided.

Figure 8:
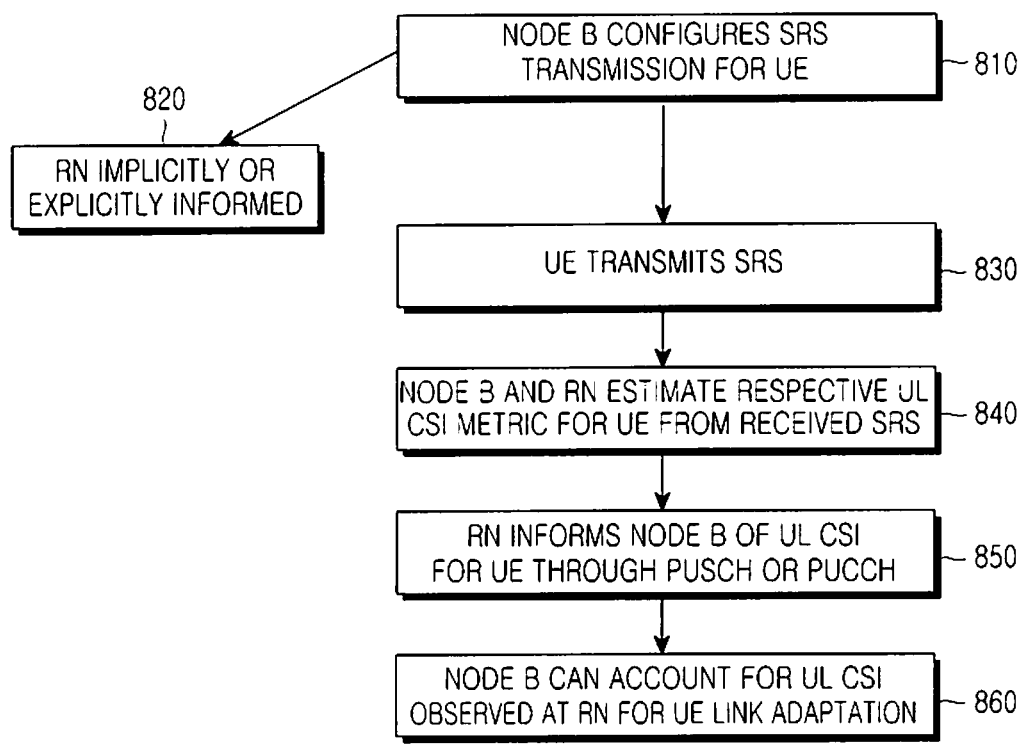
FIG. 8 is a diagram illustrating the feedback process for the UL CSI of a UE from the T-RN to the Node B.

The UL CSI feedback process from the T-RN to the Node B for a reference UE is illustrated by the flowchart in FIG. 8. The Node B configures SRS transmissions for a UE in step 810 (parameters are informed in the PDSCH through UE-specific higher layer signaling). The T-RN also obtains the SRS transmission parameters for the reference UE in step 820. After the UE transmits SRS in step 830, both the Node B and the T-RN can obtain a respective UL CSI metric for the reference UE in step 840. The T-RN informs the Node B of the UL CSI for the reference UE through PUSCH or PUCCH in step 850. For UEs for which the T-RN also participates in the PUSCH transmission the Node B can account for the UL CSI observed by the T-RN in the UE scheduling and the respective PUSCH link adaptation such as (MCS selection, transmission power, etc.) in step 860.

The selection of UEs for which the CSI is fed back from the T-RN to the Node B depends on the method used for the classification of UEs for which their communication is to be assisted or not by the T-RN. If this classification is based on a DL CSI metric UEs estimate from the CSI-RS and subsequently report to Node B, as it was previously described by FIG. 5 through FIG. 7, the Node B can determine the T-RN assisted UEs and configure the T-RN (through a PDSCH transmitted to the RN) to report the UL CSI at specified UL resources only for these UEs. If this classification is based on a UL CSI metric the T-RN and Node B determined from the SRS, the T-RN needs to report this metric for all UEs transmitting SRS at resources specified by the Node B (through a PDSCH transmitted to the T-RN). Either CSI metric may be used.

The second object of the present invention considers the support of PUSCH transmissions by T-RNs when a UE also includes Uplink Control Information (UCI), such as HARQ-ACK or CQI, in its PUSCH transmission. To enable the T-RN to assist in the transmission of PUSCH while avoiding the degradation this will have on the UCI the UE needs to transmit in that sub-frame, the invention considers the following two alternatives.

In the first alternative, the Node B configures UEs for which the PUSCH transmission is assisted by the T-RN to transmit UCI in the PUCCH. If simultaneous PUCCH and PUSCH transmissions are not supported, the PUSCH transmission may be suspended. As the T-RN does not assist in PUCCH transmissions, UCI transmission from UEs is unaffected while support of PUSCH transmissions by the T-RN can be as when the UE does not transmit any UCI in a referenced sub-frame.

In the second alternative, the T-RN can avoid having any meaningfully negative impact on the UE transmission of HARQ-ACK in the PUSCH by transmitting a known bit sequence, for example a series of alternating "+1" and "−1", in the respective PUSCH REs (which are known by the T-RN). For the HARQ-ACK, as repetition coding is typically used for its transmission in the PUSCH, the Node B receiver accumulates the respective HARQ-ACK REs before making a decision, and the impact from the T-RN transmitting a series of alternating "+1" and "−1" will be nullified by the averaging operation (an even number of REs is assumed for the HARQ-ACK transmission).

The T-RN may also use a different CS of the CAZAC sequence for the PUSCH DRS and transmit a known sequence of bits, such as for example a series of alternating "+1" and "−1" in case of HARQ-ACK, in the PUSCH REs where the UE transmits UCI. As CAZAC sequences with different CS are orthogonal (for CS difference larger than the delay spread of the channel medium), mutual interference for computing the channel estimates is avoided. Then, the Node B can reconstruct and remove the known sequence of bits transmitted by the T-RN in the REs where the UE transmits UCI.

Figure 9:
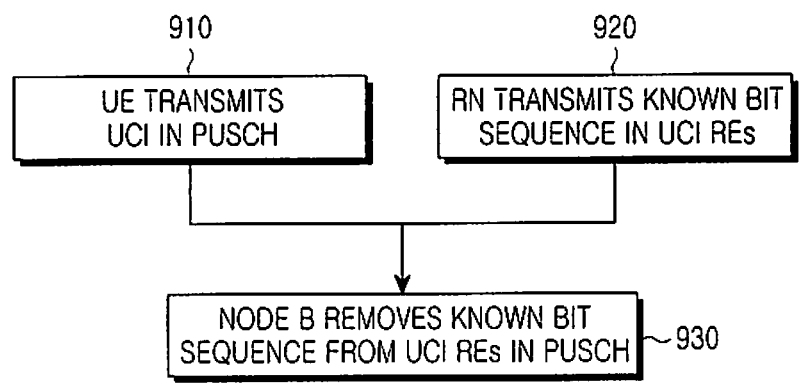
FIG. 9 is a block diagram illustrating the transmission from the T-RN of a sequence known to the Node B in PUSCH REs where the UE transmits control information.

FIG. 9 illustrates the second alternative for the second object of the invention. When the UE transmits UCI in the PUSCH in step 910, the T-RN transmits a known predetermined bit sequence in UCI REs in step 920. The T-RN may also transmit the DRS using a different CS of a CAZAC sequence. The Node B can then remove the known bit sequence from the REs where the UE transmits PUSCH in step 930. In general, by obtaining an interference-free channel estimate for the signal transmitted from the T-RN, relative to the signal transmitted from the UE, the Node B can simply remove the known bit sequence transmitted by the T-RN by multiplying it with the respective channel estimate and subtracting it from the received signal in the corresponding REs.

The third object of the present invention considers the support of PDSCH HARQ transmissions and PUSCH HARQ transmissions for a TB assuming that the scheduler and the functionalities of the MAC and RRC layers are located at the Node B. The T-RN follows the scheduling decisions from the Node B. Only the Node B or the UE performs the initial HARQ transmission for the TB and the T-RN can participate only in HARQ retransmissions for the TB. The initial HARQ transmission for the TB can be viewed as just backhaul communication between the Node B and the T-RN in the DL or between the UE and the T-RN in the UL if the MCS and/or the transmission power are such that the UE or the Node B, respectively, are unlikely to correctly receive the TB for the initial HARQ transmission.

Both the T-RN and the UE receive the initial PDSCH HARQ transmission and both the T-RN and the Node B receive the initial PUSCH HARQ transmission for a TB (correctly or incorrectly). As the Node B to T-RN link has typically much better quality (lower path loss or less shadowing leading to higher SINR) than the Node B to UE link, it can be assumed that if the T-RN decodes the TB incorrectly, so will the UE. This is not guaranteed to be always the case, but for practical purposes it is a sufficient assumption to capture the gains from the T-RN operation. If the T-RN does not correctly receive the initial PDSCH HARQ transmission for the TB when the UE does, there are no detrimental consequences as the participation of the T-RN is not needed for TB retransmissions. If neither the T-RN nor the UE correctly receive the initial PDSCH HARQ transmission for the TB, the spectral efficiency gains from having the T-RN participate in the HARQ retransmission of the TB are not materialized but this is a low probability event and has negligible impact on the overall spectral efficiency. Likewise, it can also be assumed that if the T-RN decodes a TB in the PUSCH incorrectly, so does the Node B.

As the scheduler and the MAC/RRC functionalities reside entirely at the Node B, then assuming adaptive HARQ retransmissions through a SA, the T-RN does not need to receive HARQ-ACK from the UE or the Node B, although the T-RN may receive HARQ-ACK as part of the PUCCH or PDCCH or the PUCCH reception, respectively (together with the DL SAs and UL SAs, the PCFICH, and the CRS). This is because for asynchronous (adaptive) HARQ retransmissions for a TB, the outcome of the previous PDSCH or PUSCH transmission for the TB can be determined by the RV of the HARQ process, for the same HARQ process number, which are signaled in a subsequent DL SA or UL SA, respectively. For synchronous (non-adaptive) HARQ retransmissions, the value of the NDI IE in the DL SA or the UL SA can be used to determine the outcome of the previous PDSCH or PUSCH transmission for the TB, respectively, as the role of the NDI in the DL SA or UL SA was previously described. This allows the T-RN to perform HARQ retransmissions for a TB in all DL or UL sub-frames after the initial HARQ transmission for the TB. However, as the T-RN cannot simultaneously transmit and receive PDSCH or PUSCH, no initial HARQ PDSCH or PUSCH transmissions for a TB are scheduled in DL or UL sub-frames, respectively, having HARQ retransmissions of another TB by the T-RN. During an initial PDSCH HARQ transmission for a TB the T-RN can feedback to the Node B CSI information for DL or UL link adaptation, assuming that the T-RN is not receiving an initial PUSCH HARQ transmission for another TB.

In the DL, after the T-RN receives the PDCCH (and the SAs), it can switch to the PDSCH transmission mode. At most one OFDM symbol is assumed to be enough for this switching and therefore, one OFDM symbol can be partially lost from the PDSCH transmission after the PDCCH reception and one OFDM symbol can be partially lost from the PDSCH transmission before the PDCCH reception (the last symbol of the DL sub-frame). The Node B scheduler can account for this loss in the link adaptation (by selecting the PDSCH MCS, the PDSCH Transmission Power Control (TPC) command to T-RN, the PDSCH transmission power to UE).

In the UL, the T-RN can always be in the transmission mode during HARQ retransmissions of a TB. A possible exception is when a UE also transmits SRS in the PUSCH during a HARQ retransmission of a TB. The T-RN can then either transmit its own SRS, which is orthogonal to all other SRS or, preferably, discontinue the transmission and receive the SRS transmitted by the UE. Some switching time will also be needed in that case and the T-RN can either partially receive the SRS or partially or completely discontinue the transmission in the last PUSCH symbol prior to the SRS transmission (assumed to be in the last PUSCH symbol) and also use the first PUSCH symbol in the next UL sub-frame to switch from the reception mode to the transmission mode.

Figure 10:
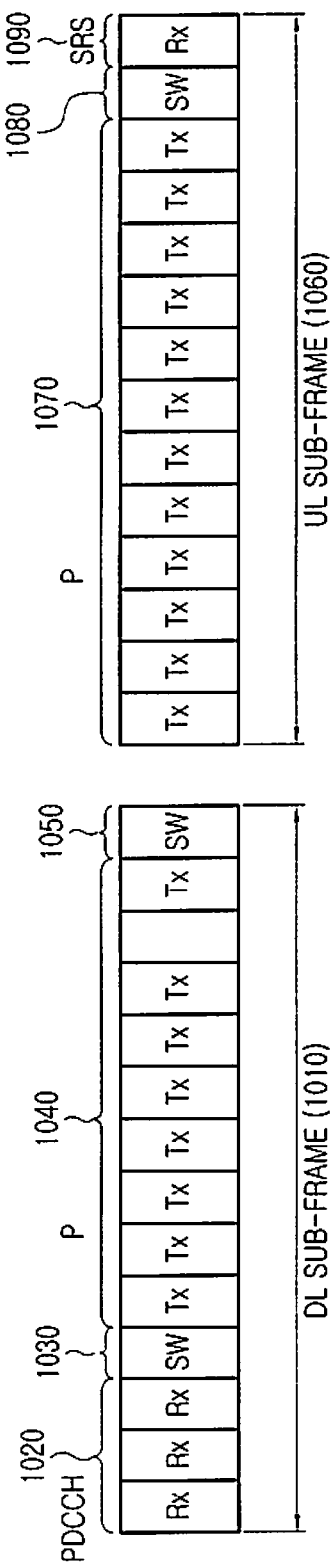
FIG. 10 is a diagram illustrating the T-RN switching between the PDCCH reception and PDSCH transmission and between the PUSCH transmission and SRS reception.

FIG. 10 illustrates the T-RN switching between the PDCCH reception and PDSCH transmission and between the PUSCH transmission and SRS reception. During a DL sub-frame 1010, the T-RN receives the PDCCH in the first three OFDM symbols 1020, uses at most one OFDM symbol 1030 to switch its mode, transmits PDSCH in the next nine OFDM symbols 1040, and then switches again its mode using at most one OFDM symbol 1050. During a UL sub-frame 1060, the T-RN transmits the PUSCH throughout the sub-frame 1070 unless some UEs assisted by the T-RN in their PUSCH transmissions also transmit SRS in the last sub-frame symbol. In that case, the T-RN uses at most one sub-frame symbol 1080 to switch its mode, and receives the SRS 1090 and may also have only partial transmission in the first symbol of the next sub-frame as it switches from the reception mode to the transmission mode. The partial or whole loss of two T-RN transmission symbols per UL sub-frame represents the worst case scenario for the T-RN operation and can be mitigated. SRS transmissions from UEs having PUSCH transmissions assisted by the T-RN can be grouped into the sub-frame with the initial HARQ transmission for a TB when the T-RN is fully in reception mode. SRS transmissions can also be configured during some HARQ retransmissions, such as for example in every other HARQ transmission starting from the initial one, if shorter SRS transmission periods are required.

Grouping of UEs with DL or UL transmissions is beneficial to the operation of the T-RN as it needs to be in the reception mode during the initial HARQ transmission of TBs and it needs to be in the transmission mode during HARQ retransmissions of TBs. Since the link between the T-RN and the UEs it serves is assumed to have good quality (relatively high SINR), multiple HARQ retransmissions for a TB are unlikely and such events will not materially impact the spectral efficiency. Moreover, the T-RN can be configured to participate only in a predetermined number of HARQ retransmissions for a TB and if some UEs require additional ones, the Node B can become the sole serving node while the T-RN starts HARQ retransmissions of other TBs to other UEs. This can be beneficial as the T-RN does not need to wait for the HARQ retransmissions of TBs for a few remaining UEs it serves to complete before beginning new HARQ retransmission of other TBs for a larger number of UEs. The maximum number of HARQ retransmissions of TBs for which the T-RN participates is predetermined either by a fixed value or by a value signaled to the T-RN from the Node B.

Figure 11:
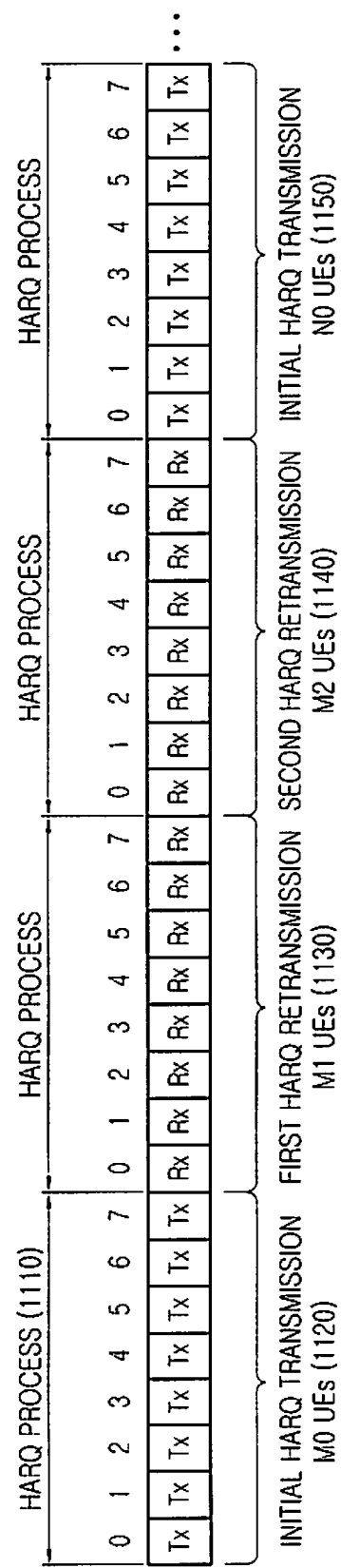
FIG. 11 is a diagram illustrating an exemplary grouping of UEs for HARQ retransmissions of TBs from a T-RN.

FIG. 11 illustrates a grouping of UEs for HARQ retransmissions from a T-RN assuming eight HARQ processes 1110. For simplicity, UL transmissions and synchronous HARQ are assumed but the description for DL transmissions or asynchronous HARQ is the equivalent. The Node B schedules initial PUSCH HARQ transmissions for TBs from M0 UEs which are also served by the T-RN (and initial PUSCH HARQ transmissions or PUSCH HARQ retransmissions for TBs from UEs not served by the T-RN) 1120. The T-RN participates in the first PUSCH HARQ retransmissions of TBs 1130 from M1 UEs, where M1≤M0 as some of the initial PUSCH HARQ transmissions of TBs may have been correctly received. The T-RN also participates in the second PUSCH HARQ retransmissions of TBs 1140 from M2 UEs, where M2≤M1 as some of the first PUSCH HARQ retransmissions of TBs may have been correctly received. Subsequently, the Node B schedules a new set of initial PUSCH HARQ transmissions of TBs from NO UEs 1150 also served by the T-RN. If there are any of the M2 UEs from which the second HARQ retransmissions of TBs were not correctly received, the Node B becomes the only node participating in subsequent HARQ retransmissions of these TBs. In the exemplary setup of FIG. 11, the maximum number of HARQ retransmissions from the T-RN is two while the maximum number of HARQ retransmissions from a UE can be four.

In order for the T-RN to be able to perform PDSCH HARQ retransmissions of TBs (which may be scheduled in any sub-frame) simultaneously with the Node B, the T-RN is informed of the respective PDSCH transmission parameters through a DL SA one or more sub-frames in advance in order to prepare the PDSCH transmission of TBs. This is not necessary for PUSCH retransmissions of TBs (although it could be performed in the same manner as for PDSCH retransmissions) as both the RN and the UE need to prepare them after the UL SA is received. This is also not necessary for synchronous non-adaptive PDSCH HARQ transmissions of TBs. For the T-RN to identify the UE for which a DL SA transmitted in an earlier sub-frame is intended for, the Node B is assumed to scramble the CRC bits of the DL SA with the UE Identity (UE ID). The UE descrambles the CRC from a decoded DL SA with its ID, and it considers the DL SA as intended for it if the CRC check passes. The SA for each is UE is assumed to be separately encoded from SAs to other UEs.

Figure 12:
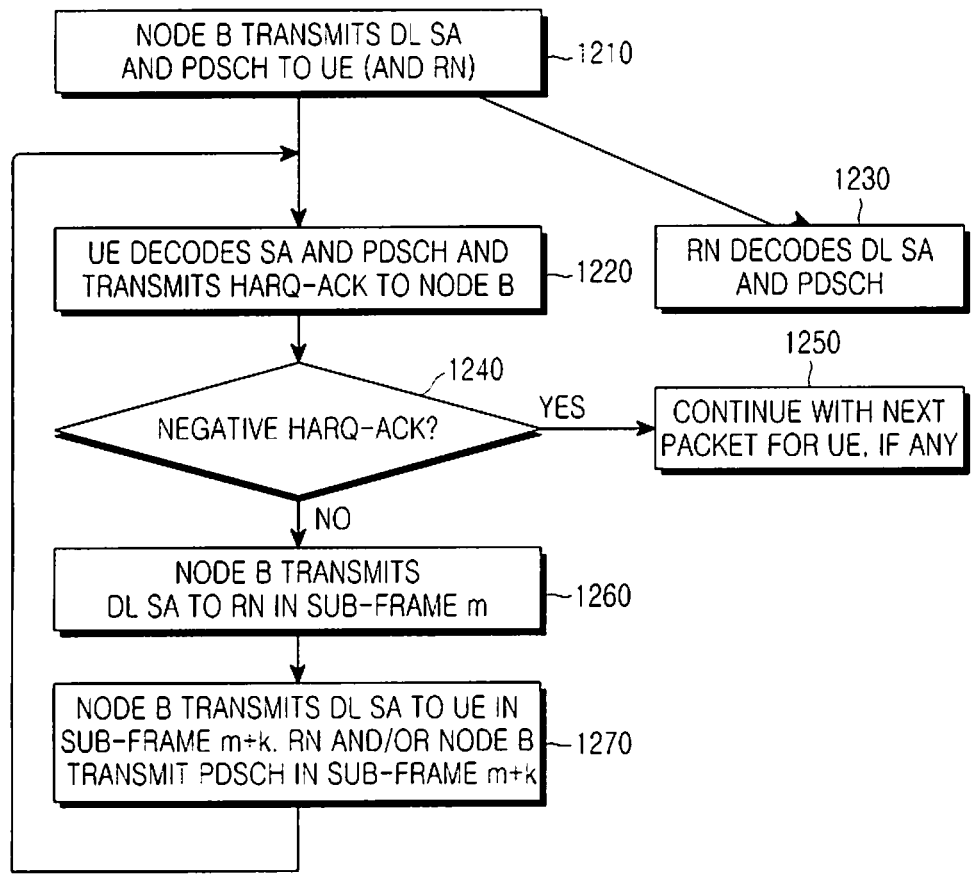
FIG. 12 is a diagram illustrating the process for PDSCH HARQ transmissions of TBs from the Node B and the RN.

FIG. 12 illustrates the process for PDSCH HARQ transmissions of TBs from the Node B and the T-RN. The Node B begins the initial PDSCH HARQ transmission for a TB by sending a DL SA and the associated PDSCH to the UE in step 1210. The UE decodes the DL SA and the TB in the corresponding PDSCH and transmits the associated HARQ-ACK signal to the Node B in step 1220. The T-RN also decodes the DL SA and the TB in the PDSCH in step 1230. Unlike the UE, the T-RN may not transmit a HARQ-ACK signal to the Node B. The Node B determines the HARQ-ACK value in step 1240. If it is an ACK, the communication with the UE continues with a new TB in step 1250, if any. If it is a NACK, the Node B transmits a DL SA to the T-RN in a subsequent sub-frame m in step 1260. The DL SA allows for adaptive HARQ and conveys the transmission parameters for the PDSCH HARQ retransmissions. These parameters include the MCS, the PRBs, possible TPC commands for the PDSCH transmission from the T-RN, the sub-frame number of subsequent PDSCH transmissions if not predetermined, and so on. The TPC commands may already exist in the DL SA for PDSCH transmission to the UE but their interpretation is different for the DL SA transmitted to the T-RN. For the UE, the TPC commands control the power of the subsequent HARQ-ACK transmissions while for the T-RN they may control the PDSCH transmission power. Then, during sub-frame m+k, k>0, the Node B transmits the DL SA to the UE and both the Node B and the T-RN transmit the PDSCH for the HARQ retransmission in step 1270. The process then returns to step 1220 in a similar manner. The above process implicitly assumes that the PDSCH conveys one TB but it can be generalized in a straightforward manner for the case the PDSCH conveys multiple TBs.

The DL SA with which the Node B informs the T-RN of the PDSCH transmission parameters to a UE needs to be distinguished from the DL SA the Node B informs the UE of the respective PDSCH transmission parameters. This can be achieved through either of the following two alternatives:

a) The Node B may use different formats for the DL SA transmitted to the T-RN and for the DL SA transmitted to the UE. The UE is not configured to receive the DL SA format used for the T-RN. For example, the DL SA for a UE can be UE-specific (separately coded DL SAs for multiple UEs) while the DL SA for the T-RN can correspond to DL SAs for multiple UEs (jointly coded DL SAs for multiple UEs) and the CRC for the DL SA to the T-RN is masked with the T-RN ID.

b) The Node B may use the same DL SA format for the UE and for the T-RN, but instead of only scrambling the CRC with the UE ID, the CRC can additionally be scrambled with another predetermined mask, such as for example the T-RN ID or a series of bits with value zero followed by a single bit with value one.

Figure 13:
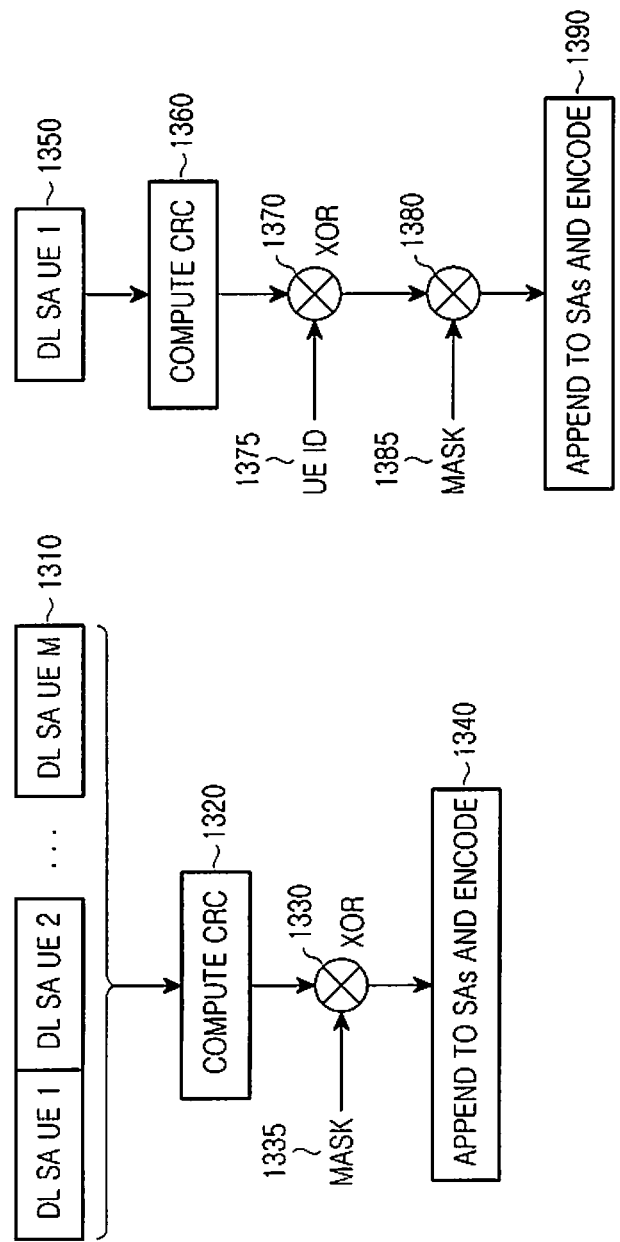
FIG. 13 is a diagram illustrating the identification process at a Node B for a DL SA intended for the T-RN.

FIG. 13 illustrates the process at the Node B for the identification of a DL SA intended for the T-RN and indicating the PDSCH transmission for a UE with the first and with the second of the aforementioned alternatives. With the first alternative, the transmission of multiple DL SAs (including one DL SA) to the T-RN is jointly coded (or the DL SAs are separately coded, each using a different DL SA format than the one used for the respective UE). After the information bits 1310 of the DL SAs are determined, the CRC is computed in step 1320, and it is subsequently scrambled in step 1330, through the eXclusive "OR" (XOR) binary operation, by a mask 1335 which may be T-RN specific (e.g. the T-RN ID) or predetermined as previously described. After the masked CRC is obtained, it is appended to the SA information bits and they are jointly encoded in step 1340. Jointly encoding the SAs is suitable when scheduling of UEs assisted by the T-RN is grouped. With the second alternative, each DL SA 1350 has a separate CRC 1360 which is then scrambled in step 1370, through the XOR operation, by the UE ID 1375 the DL SA is eventually intended for. To avoid the UE decoding the DL SA at the wrong sub-frame, additional scrambling is applied in step 1380 with another mask 1385, such as for example the T-RN ID. Finally, the scrambled CRC bits are appended to the DL SA information bits and the combined result is encoded in step 1390.

Although the previous procedure considered asynchronous HARQ, it can also be applied in case of synchronous (non-adaptive) HARQ. Even though for synchronous HARQ it may appear that the UE cannot confuse the sub-frame for which a DL SA is intended for, and hence will not confuse an earlier transmitted DL SA which is actually intended for the T-RN, this is not the case if the HARQ process number is not indicated in the DL SA which is typically the case with synchronous HARQ. Then, without additional measures such as the previously described scrambling with a different mask than just the UE ID mask or without using a different format for the DL SA the UE is not configured to monitor, the UE may confuse the earlier DL SA as one corresponding to a different HARQ process.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for receiving reference signals (RSs) transmitted from a user equipment (UE) in a communication system including a Node B, a transparent-relay node (T-RN), and the UE, the method comprising the steps of:

signaling by the Node B, RS transmission parameters to the UE;

receiving, by the Node B, an RS for the UE transmitted from the UE; and estimating, by the Node B, a channel state information (CSI) metric based on the RS for the UE, wherein the T-RN obtains the RS transmission parameters either through separate signaling from the Node B or through the same signaling it is informed from the Node B to the UE, wherein the T-RN discontinues the transmission of a transport block (TB) to the Node B at a transmission symbol determined from the transmission symbol the UE transmits the RS and the time required for the T-RN to switch from transmitting the TB to receiving the RS, and wherein the T-RN is a decode and forward relay node that shares a same physical cell identity as the Node B.

2. The method of claim 1, wherein the T-RN transmits to the Node B information obtained from the reception of the RS transmitted from the UE.

3. An apparatus for receiving reference signals (RSs) transmitted from a user equipment (UE) in a communication system including a Node B, a transparent-relay node (T-RN), and the UE, the apparatus comprising:
- a transmitter for signaling, by the Node B, RS transmission parameters to the UE;
- a receiver for receiving, by the Node B, an RS for the UE transmitted from the UE; and
- a controller for estimating, by the Node B, a channel state information (CSI) metric based on the RS for the UE,
- wherein the T-RN obtains the RS transmission parameters either through separate signaling from the Node B or through the same signaling it is informed from the Node B to the UE,
- wherein the T-RN discontinues the transmission of a transport block (TB) to the Node B at a transmission symbol determined from the transmission symbol the UE transmits the RS and the time required for the T-RN to switch from transmitting the TB to receiving the RS, and
- wherein the T-RN is a decode and forward relay node that shares a same physical cell identity as the Node B.

4. The apparatus of claim 3, wherein the T-RN transmits to the Node B information obtained from the reception of the RS transmitted from the UE.

5. A method for receiving reference signals (RSs) transmitted from a user equipment (UE) in a communication system including a Node B, a transparent-relay node (T-RN), and the UE, the method comprising the steps of:
- receiving, by the UE, RS transmission parameters from the Node B; and
- transmitting, by the UE, an RS for the UE to the Node B and the T-RN;
- wherein the T-RN obtains the RS transmission parameters either through separate signaling from the Node B or through the same signaling it is informed from the Node B to the UE,
- wherein the T-RN discontinues the transmission of a transport block (TB) to the Node B at a transmission symbol determined from the transmission symbol the UE transmits the RS and the time required for the T-RN to switch from transmitting the TB to receiving the RS, and
- wherein the T-RN is a decode and forward relay node that shares a same physical cell identity as the Node B.

6. The method of claim 5, wherein the T-RN transmits to the Node B information obtained from the reception of the RS transmitted from the UE.

7. An apparatus for receiving reference signals (RSs) transmitted from a user equipment (UE) in a communication system including a Node B, a transparent-relay node (T-RN), and the UE, the apparatus comprising:
- a receiver for receiving RS transmission parameters from the Node B; and
- a transmitter for transmitting an RS for the UE to the Node B and the T-RN;
- wherein the T-RN obtains the RS transmission parameters either through separate signaling from the Node B or through the same signaling it is informed from the Node B to the UE,
- wherein the T-RN discontinues the transmission of a transport block (TB) to the Node B at a transmission symbol determined from the transmission symbol the UE transmits the RS and the time required for the T-RN to switch from transmitting the TB to receiving the RS, and
- wherein the T-RN is a decode and forward relay node that shares a same physical cell identity as the Node B.

8. The apparatus of claim 7, wherein the T-RN transmits to the Node B information obtained from the reception of the RS transmitted from the UE.

9. A method for receiving reference signals (RSs) transmitted from a user equipment (UE) in a communication system including a Node B, a transparent-relay node (T-RN), and the UE, the method comprising the steps of:
- receiving, by the T-RN, an RS for the UE transmitted from the UE; and
- estimating, by the T-RN, a channel state information (CSI) metric based on the RS for the UE,
- wherein the T-RN obtains RS transmission parameters either through separate signaling from the Node B or through the same signaling it is informed from the Node B to the UE,
- wherein the T-RN discontinues the transmission of a transport block (TB) to the Node B at a transmission symbol determined from the transmission symbol the UE transmits the RS and the time required for the T-RN to switch from transmitting the TB to receiving the RS, and
- wherein the T-RN is a decode and forward relay node that shares a same physical cell identity as the Node B.

10. The method of claim 9, wherein the T-RN transmits to the Node B information obtained from the reception of the RS transmitted from the UE.

11. An apparatus for receiving reference signals (RSs) transmitted from a user equipment (UE) in a communication system including a Node B, a transparent-relay node (T-RN), and the UE, the apparatus comprising:
- a receiver for receiving, by the T-RN, an RS for the UE transmitted from the UE; and
- a controller for estimating, by the T-RN, a channel state information (CSI) metric based on the RS for the UE,
- wherein the T-RN obtains RS transmission parameters either through separate signaling from the Node B or through the same signaling it is informed from the Node B to the UE,
- wherein the T-RN discontinues the transmission of a transport block (TB) to the Node B at a transmission symbol determined from the transmission symbol the UE transmits the RS and the time required for the T-RN to switch from transmitting the TB to receiving the RS, and
- wherein the T-RN is a decode and forward relay node that shares a same physical cell identity as the Node B.

12. The apparatus of claim 11, wherein the T-RN transmits to the Node B information obtained from the reception of the RS transmitted from the UE.

* * * * *

UNITED STATES PATENT AND TRADEMARK OFFICE
CERTIFICATE OF CORRECTION

PATENT NO. : 9,565,664 B2  
APPLICATION NO. : 13/774452  
DATED : February 7, 2017  
INVENTOR(S) : Papasakellariou et al.

Page 1 of 1

It is certified that error appears in the above-identified patent and that said Letters Patent is hereby corrected as shown below:

On the Title Page

(57) ABSTRACT:
Column 2 Line 9, "(HARD)" should be -- (HARQ) --.

Signed and Sealed this
Twelfth Day of June, 2018

Andrei Iancu
*Director of the United States Patent and Trademark Office*